UNITED STATES PATENT OFFICE.

FRITZ DAHLHAUS, OF PHILADELPHIA, PENNSYLVANIA.

PAINT-OIL.

No. 867,951.      Specification of Letters Patent.      Patented Oct. 15, 1907.

Application filed April 7, 1906. Serial No. 310,434.

*To all whom it may concern:*

Be it known that I, FRITZ DAHLHAUS, of Philadelphia, in the State of Pennsylvania, have invented a new and useful Improvement in Paint-Oils, whereof the following is a specification.

It is the object of my invention to provide a liquid to be substituted for turpentine in the mixing of paints, and thereby render said paints susceptible of being freely applied to a plaster wall, or other porous surface without leaving any visible demarcation of the brush strokes where the compound is applied to the surface previously coated therewith; and when dry, to present a uniformly dull, flat finish not attainable by the use of turpentine, or other ordinary liquid vehicles.

The essential ingredients of my improved compound are turpsine, japan drier, and a petroleum oil; for instance, crude petroleum, or paraffin oil or both. I also find it preferable to add varnish to the mixture aforesaid if it is to be applied to wood, and in either case, a perfume such as citronella oil may be added, without apparent change in the characteristics of the coating.

A typical formula of my compound adapted for use on wood is as follows:—

| | |
|---|---|
| Turpsine | 7,680 parts. |
| Japan drier | 60 " |
| Crude petroleum | 2 " |
| Paraffin oil | 2 " |
| Varnish | 120 " |
| Citronella oil | 1 " |

It is to be noted that an equivalent quantity of crude petroleum may be substituted for the paraffin oil, or vice versa in said formula.

Turpsine is a proprietary article of commerce which at 25° C. is of approximately .78 specific gravity, being a compound of approximately 66% petroleum naphtha, 33% of turpentine, and 1% of wood alcohol. The paraffin oil may be of .92 specific gravity and the varnish may be ordinary copal varnish.

Owing to the rapid drying of paint, mixed with turpentine, two operators are required to apply such paint properly to the walls of a room, both starting at the same place on the wall and working continuously in opposite directions, until they meet at the opposite side of the room, where the edges of the paint coating must be merged while wet; to avoid any visible lines of demarcation. My improved compound is advantageous in that it is not readily absorbed by the wall, and therefore, facilitates the free working of the paint, with which it is mixed, and permits its application by one operator who may readily blend the terminal edge of the paint coating with the initial edge thereof, without leaving any visible marks of the joined edges. Furthermore, by the use of my compound, the paint mixed therewith presents, when first applied, a smooth, glossy coating, which not only may be readily blended with a previously applied coating, but when dry, also presents a smooth, dull finish, which is uniform throughout its extent.

I claim:—

1. The hereinbefore described compound, comprising turpsine, japan drier, and petroleum oil, substantially as set forth.

2. The hereinbefore described compound, comprising turpsine, japan drier, and crude petroleum, substantially as set forth.

3. The hereinbefore described compound, comprising turpsine, japan drier, petroleum oil and varnish, substantially as set forth.

4. The hereinbefore described compound, comprising turpsine, japan drier, petroleum oil, varnish, and citronella oil, substantially as set forth.

5. The hereinbefore described compound, comprising turpsine, 7680 parts; japan drier, 60 parts; petroleum oil, 4 parts; varnish, 120 parts, and citronella oil, 1 part, substantially as set forth.

In testimony whereof, I have hereunto signed my name, at Philadelphia, Pennsylvania, this sixth day of April 1906.

FRITZ DAHLHAUS.

Witnesses:
    WILLIAM J. KOCH,
    JOSEPH B. PURCELL.